(12) United States Patent
Zhao

(10) Patent No.: US 11,047,430 B2
(45) Date of Patent: Jun. 29, 2021

(54) ROTATING SHAFT CONNECTION APPARATUS AND MULTI-SCREEN MOBILE TERMINAL DEVICE

(71) Applicant: ZTE CORPORATION, Guangdong (CN)

(72) Inventor: Yang Zhao, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/610,495

(22) PCT Filed: Sep. 22, 2017

(86) PCT No.: PCT/CN2017/103037
§ 371 (c)(1),
(2) Date: Nov. 2, 2019

(87) PCT Pub. No.: WO2019/010823
PCT Pub. Date: Jan. 17, 2019

(65) Prior Publication Data
US 2020/0158189 A1  May 21, 2020

(30) Foreign Application Priority Data
Jul. 10, 2017  (CN) .......................... 201720830726.7

(51) Int. Cl.
*H04M 1/00* (2006.01)
*F16D 27/00* (2006.01)
(Continued)

(52) U.S. Cl.
CPC ............ *F16D 27/004* (2013.01); *F16D 11/14* (2013.01); *H04M 1/0214* (2013.01);
(Continued)

(58) Field of Classification Search
CPC .. F16D 27/004; F16D 11/14; F16D 2011/004; F16D 2011/006; F16D 2121/20;
(Continued)

(56) References Cited

U.S. PATENT DOCUMENTS 2,496,871 A * 2/1950 Griffin ...................... F16D 3/18
74/380
4,429,478 A * 2/1984 Bruce-Sanders ......... G09F 9/30
40/447
(Continued)

FOREIGN PATENT DOCUMENTS

| CN | 102709078 A | * 10/2012 |
| CN | 103149384 A | * 6/2013 |

(Continued)

OTHER PUBLICATIONS

Wu Yan, CN-203909673-U Translation, Oct. 2014 (Year: 2014).*
(Continued)

*Primary Examiner* — Mahendra R Patel

(57) ABSTRACT

A rotating shaft connection apparatus and a multi-screen mobile terminal device are related to. The rotating shaft connection apparatus includes a rotating shaft, a drive member, an adapting member, and a magnetic member. The drive member is fixed on the rotating shaft; the adapting member and the magnetic member are rotatably sleeved on the rotating shaft; the adapting member is located between the drive member and the magnetic member; and the adapting member is slidably engaged with the rotating shaft in an axial direction. In a first state, the adapting member is engaged with the drive member in a locking manner, and the rotating shaft is rotated so as to rotate the adapting member; and in a second state, the rotating shaft stops rotating, and the adapting member is engaged with the magnetic member in a locking manner.

14 Claims, 4 Drawing Sheets

(51) Int. Cl.
*F16D 11/14* (2006.01)
*H04M 1/02* (2006.01)
*F16D 11/00* (2006.01)
*F16D 121/20* (2012.01)
*F16D 127/02* (2012.01)
*G06F 1/16* (2006.01)

(52) U.S. Cl.
CPC ..... *H04M 1/0266* (2013.01); *F16D 2011/004* (2013.01); *F16D 2011/006* (2013.01); *F16D 2121/20* (2013.01); *F16D 2127/02* (2013.01); *F16D 2200/0008* (2013.01); *G06F 1/1626* (2013.01); *H04M 2250/12* (2013.01); *H04M 2250/16* (2013.01)

(58) Field of Classification Search
CPC ........ F16D 2127/02; F16D 2200/0008; H04M 1/0214; H04M 1/0266; H04M 2250/12; H04M 2250/16; H04M 1/0216; G06F 1/1626; G06F 1/1681; F16C 11/12; F16J 15/3484; F16J 15/43; F16L 39/04; F16L 59/185; G01L 3/104
USPC ...................................................... 455/575.3
See application file for complete search history.

(56) References Cited

U.S. PATENT DOCUMENTS

| | | | | |
|---|---|---|---|---|
| 5,038,136 A * | 8/1991 | Watson | ..................... | B60Q 1/50 340/480 |
| 5,528,258 A * | 6/1996 | Moon | ..................... | G09F 11/025 340/815.58 |
| 5,732,493 A * | 3/1998 | Luedtke | .................. | G09F 19/02 40/411 |
| 5,771,152 A * | 6/1998 | Crompton | ............. | G06F 1/1601 248/923 |
| 5,774,384 A * | 6/1998 | Okaya | ..................... | G06F 1/1616 341/22 |
| 8,419,448 B2 * | 4/2013 | Konno | .................. | H01R 43/007 439/86 |
| 9,963,190 B1 * | 5/2018 | Liu | ......................... | B62K 25/02 |
| 2008/0296997 A1 * | 12/2008 | Bando | .................... | H02K 1/276 310/261.1 |
| 2009/0144934 A1 * | 6/2009 | Kitagawa | ............... | G06F 1/1616 16/320 |
| 2009/0200259 A1 * | 8/2009 | Baughman | ........... | B65D 39/082 215/217 |
| 2009/0315860 A1 * | 12/2009 | Lee | ...................... | G06F 3/03545 345/179 |
| 2010/0289198 A1 * | 11/2010 | Balsells | .................. | B21F 35/00 267/151 |
| 2010/0327687 A1 * | 12/2010 | Iannello | ............... | F16C 32/0442 310/90.5 |
| 2011/0031744 A1 * | 2/2011 | Takahashi | ............... | F16L 39/04 285/351 |
| 2014/0312579 A1 * | 10/2014 | Sun | ................... | C03B 37/01884 279/43.9 |
| 2014/0376145 A1 * | 12/2014 | Zhang | .................. | G06F 1/1681 361/143 |
| 2016/0004366 A1 * | 1/2016 | Chen | ..................... | G06F 1/1681 345/173 |
| 2016/0195183 A1 * | 7/2016 | Matsuda | ............... | F16C 19/364 464/97 |

FOREIGN PATENT DOCUMENTS

| | | | | | |
|---|---|---|---|---|---|
| CN | 203535932 U | * | 4/2014 | | |
| CN | 203909673 U | * | 10/2014 | | |
| CN | 104575388 A | * | 4/2015 | | |
| CN | 105004311 A | * | 10/2015 | | |
| CN | 105278617 A | | 1/2016 | | |
| KR | 20160004366 A | * | 1/2016 | ............. | H04W 4/06 |
| WO | WO-2009119176 A1 | * | 10/2009 | ........... | F16J 15/3484 |

OTHER PUBLICATIONS

Gao Le, CN-203535932-U, Apr. 2014 (Year: 2014).*
Xiaoxia Cao, CN-102709078-A Translation, Oct. 2012 (Year: 2012).*
International search report of PCT Patent Application No. PCT/CN2017/103037 dated Apr. 12, 2018.

* cited by examiner

ROTATING SHAFT CONNECTION APPARATUS AND MULTI-SCREEN MOBILE TERMINAL DEVICE

FIELD OF THE INVENTION

The disclosure relates to the technical field of communication devices, and in particular, to a rotating shaft connection apparatus and a multi-screen mobile terminal device having the rotating shaft connection apparatus.

BACKGROUND OF THE INVENTION

With the development of communication technologies, uses of mobile terminal devices such as mobile phones and tablets are constantly expanding, and screens of mobile terminal devices are getting increasingly larger. However, a too large screen size can lead to decreased portability of a mobile terminal device, and therefore, it has become a trend to develop dual-screen mobile terminal devices, especially dual-screen mobile phones. For now, the two screens of a dual-screen mobile phone are mostly connected by a purely mechanical rotating shaft apparatus. Such a mechanical rotating shaft apparatus is simple in structure and low in cost, but has the following disadvantages. First, the rotating shaft is unevenly stressed during a rotating process, which affects the hand feeling of a user. Second, the locking force of the rotating shaft is difficult to adjust; if the locking force is too small, the closing and opening positions of the mobile phone will not be easily fixed, and if the locking force is too large, a relatively large force will be required during the entire stroke, which leads to poor user experiences and even has security risks.

SUMMARY OF THE INVENTION

A main objective of the disclosure is to provide a rotating shaft connection apparatus, so as to solve the technical problem of poor user experiences and low comfort due to the fact that a conventional rotating shaft connection apparatus is unevenly stressed during a rotating process and the locking force is difficult to adjust.

In order to achieve the above objective, the rotating shaft connection apparatus provided by the disclosure includes a rotating shaft, a drive member, an adapting member, and a magnetic member. The drive member is fixed on the rotating shaft. The adapting member and the magnetic member are rotatably sleeved on the rotating shaft. The adapting member is located between the drive member and the magnetic member, and the adapting member is slidably engaged with the rotating shaft in an axial direction. In a first state, the adapting member is engaged with the drive member in a locking manner, and the rotating shaft is rotated to rotate the adapting member; and in a second state, the rotating shaft stops rotating, and the adapting member is engaged with the magnetic member in a locking manner.

According to one exemplary embodiment, the adapting member is a permanent magnet, and the magnetic member is an electromagnet.

According to one exemplary embodiment, the rotating shaft connection apparatus further includes an elastic member provided between the drive member and the adapting member, the elastic member is configured to enable the adapting member to return to the second state when the rotating shaft stops rotating.

According to one exemplary embodiment, the elastic member is a compression spring and is sleeved on the rotating shaft, an end of the elastic member is elastically abutted against the drive member, and another end of the elastic member is elastically abutted against the adapting member.

According to one exemplary embodiment, the adapting member is provided with an annular groove at a side, facing the drive member, of the adapting member, and the elastic member is compressibly received in the annular groove.

According to one exemplary embodiment, two end sides of the adapting member are respectively provided with a plurality of hemispherical protruding teeth along a circumferential direction of the rotating shaft, and an end side of the drive member and an end side of the magnetic member facing the adapting member are respectively provided with hemispherical recesses adapted to the protruding teeth.

According to one exemplary embodiment, the rotating shaft connection apparatus further includes a motor. In the first state, the motor drives the rotating shaft to rotate the adapting member.

In order to achieve the aforementioned objective, the disclosure also provides a multi-screen mobile terminal device. The multi-screen mobile terminal device includes a plurality of display screens, and a rotating shaft connection apparatus as described above connecting any two adjacent display screens. Between the two adjacent display screens, one display screen is fixedly connected with the rotating shaft and the magnetic member, and the other display screen is fixedly connected with the adapting member.

According to one exemplary embodiment, the multi-screen mobile terminal device further includes a rotation control unit. The rotating shaft connection apparatus includes a motor. The magnetic member is an electromagnet. The rotation control unit is electrically connected with the motor and the magnetic member, and is configured to control the rotating shaft connection apparatus to rotate to a predetermined position based on a predetermined rotation angle.

According to one exemplary embodiment, the multi-screen mobile terminal device further includes a gyro sensor electrically connected with the rotation control unit. The rotation control unit is further configured to adjust a relative rotation angle between any two adjacent display screens in real time based on a spatial coordinate value fed back by the gyro sensor.

In the embodiments of the disclosure, through providing a drive member, an adapting member, and a magnetic member on a rotating shaft, the rotating shaft connection apparatus is controlled to freely switch between a rotating state and a stationary state by means of drive cooperation of these members. Specifically, in the first state, the adapting member and the drive member are locked and engaged with each other through a magnetic force action, so that when the rotating shaft rotates, the drive member fixed on the rotating shaft drives the adapting member to rotate; in the second state, the rotating shaft stops rotating, and the adapting member and the magnetic member are locked and engaged with each other, causing the adapting member to be locked and prevented from rotating further. The rotating shaft connection apparatus provided by the embodiments of the disclosure has a simple structure; the rotating shaft can be smoothly rotated, so that the adapting member is evenly stressed; and the adapting member and the magnetic member attract each other by the magnetic force and are locked and engaged with each other, which facilitates adjustment of the locking force. User experience and comfort level is thus greatly improved.

BRIEF DESCRIPTION OF THE DRAWINGS

In order to more clearly illustrate technical solutions in embodiments of the disclosure or in the prior art, drawings to be used in describing the embodiments or the prior art will be briefly introduced below. It is apparent that the drawings in the following description show only certain embodiments of the disclosure, and other drawings may be obtained by a person of ordinary skill in the art based on these drawings without paying any creative work.

DESCRIPTION OF REFERENCE NUMERALS

Figure 1:
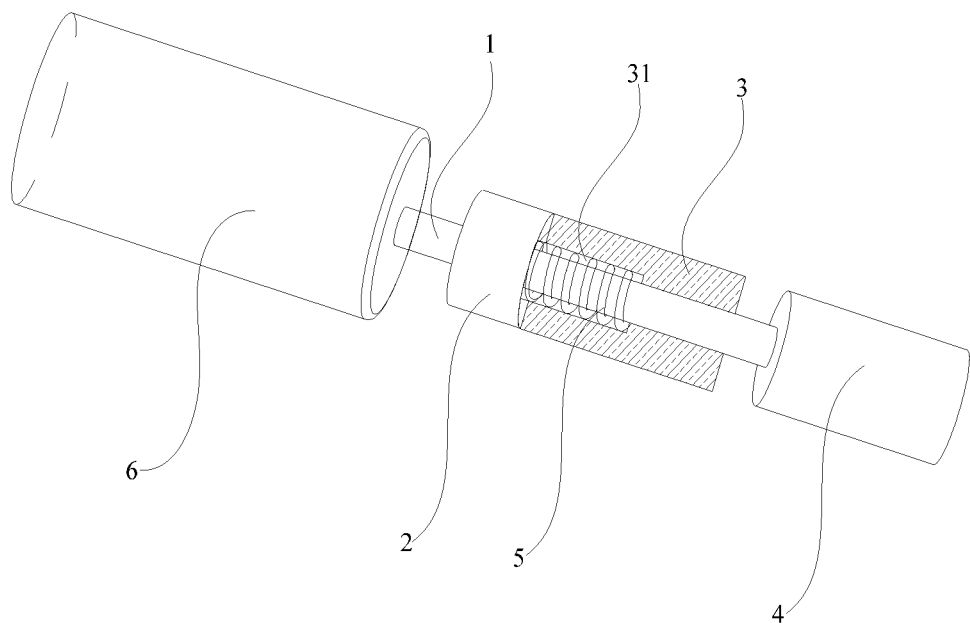
FIG. 1 is a schematic structural view of a rotating shaft connection apparatus in a first state according to an embodiment of the disclosure.

| Reference numerals | Names | Reference numerals | Names |
| --- | --- | --- | --- |
| 1 | rotating shaft | 4 | magnetic member |
| 2 | drive member | 41 | recess |
| 3 | adapting member | 5 | elastic member |
| 31 | annular groove | 6 | motor |
| 32 | protruding tooth | | |

The implementation, functional features, and advantages of the disclosure will be further described with reference to the embodiments and accompanying drawings.

DETAILED DESCRIPTION OF THE EMBODIMENTS

The technical solutions in the embodiments of the disclosure will be clearly and thoroughly described below with reference to the accompanying drawings used in the embodiments of the disclosure. It is apparent that the described embodiments are merely some of rather than all of the embodiments of the disclosure. All other embodiments obtained by a person of ordinary skill in the art based on the embodiments disclosed herein without paying any creative work shall fall within the protection scope of the disclosure.

It shall be noted that if there are directional indications (such as upper, lower, left, right, front, back, . . . ) in the embodiments of the disclosure, such a directional indication is only intended to explain a relative positional relationship, a movement condition and so on between various components in a specific state (as shown in the drawings), and if this specific state changes, the directional indication also changes accordingly.

In addition, if there are descriptions of "first", "second", etc., in the embodiments of the disclosure, such a description of "first", "second", etc., is used only for purpose of description, and shall not to be construed as indicating or implying its relative importance or implicitly indicating the number of the technical features described. Thus, each feature being defined with "first" or "second" may explicitly or implicitly includes at least one said feature. Further, technical solutions of various embodiments may be combined with one another. Such a combination, however, must be based on the fact that it can be implemented by a person of ordinary skill in the art. When a combination of technical solutions is contradictory or impossible to implement, such a combination shall be considered to not exist and not to be within the protection scope of the disclosure.

The disclosure provides a rotating shaft connection apparatus.

Figure 2:
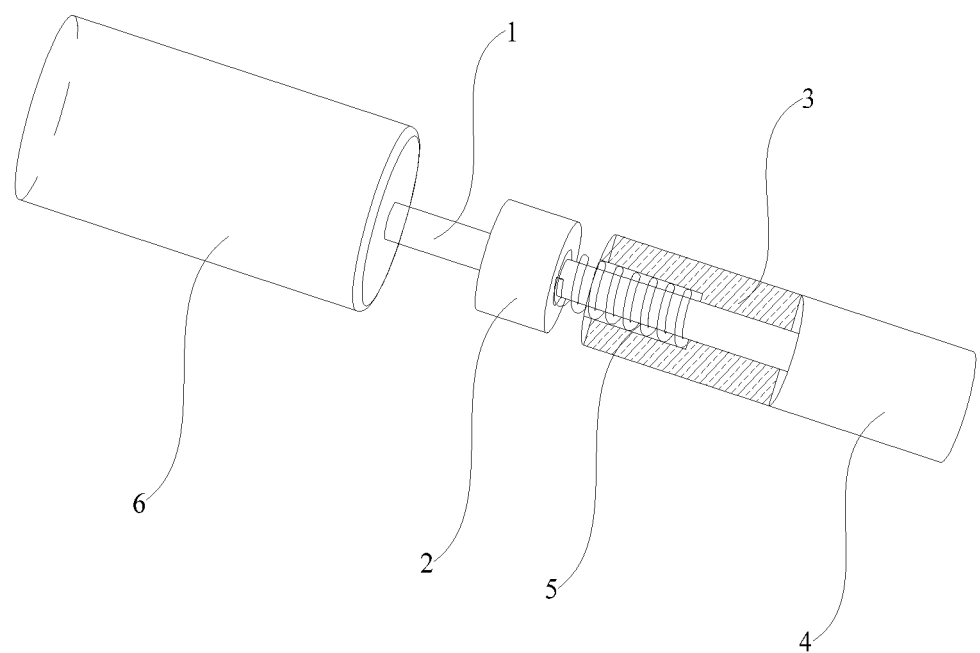
FIG. 2 is a schematic structural view of the rotating shaft connection apparatus as shown in FIG. 1 in a second state.

In an embodiment of the disclosure, as shown in FIGS. 1 and 2, the rotating shaft connection apparatus includes a rotating shaft 1, a drive member 2, an adapting member 3, and a magnetic member 4. The drive member 2 is fixed on the rotating shaft 1. The adapting member 3 and the magnetic member 4 are rotatably sleeved on the rotating shaft 1. The adapting member 3 is located between the drive member 2 and the magnetic member 4. The adapting member 3 is slidably engaged with the rotating shaft 1 in an axial direction. In a first state, the adapting member 3 is locked and engaged with the drive member 2 through a magnetic force action, and the rotating shaft 1 is rotated to rotate the adapting member 3. In a second state, the rotating shaft 1 stops rotating, and the adapting member 3 is locked and engaged with the magnetic member 4.

In the present embodiment, the rotating shaft 1 is rotatable under a certain driving force. For example, the rotating shaft 1 can be driven by a motor or a magnetic force. The drive member 2 is fixedly connected with the rotating shaft 1 and is rotatable together with the rotating shaft 1, the drive member 2 is usually a cylindrical sleeve. A sliding state of the adapting member 3 on the rotating shaft 1 may be controlled by changing a magnetic pole direction between the adapting member 3 and the magnetic member 4. In the first state, a magnetic repulsive force is generated between the adapting member 3 and the magnetic member 4, enabling the adapting member 3 to slide toward the drive member 2 and be locked and engaged with the drive member 2. In the second state, a magnetic attractive force is generated between the adapting member 3 and the magnetic member 4, enabling the adapting member 3 to slide towards the magnetic member 4 and be locked and engaged with the magnetic member 4.

Preferably, the adapting member 3 is a permanent magnet, and may be made of a permanent magnet material such as neodymium iron boron or ferrite. The magnetic member 4 is an electromagnet, and a magnetic force magnitude and a magnetic pole direction of the electromagnet may be controlled by controlling a current. The magnetic member 4 is usually formed into a cylindrical electromagnetic shaft sleeve and sleeved fixedly on the rotating shaft 1.

According to the rotating shaft connection apparatus of the disclosure, the rotating shaft connection apparatus is controlled to switch freely between two states namely a rotating state and a stationary state by providing a drive member 2, an adapting member 3, and a magnetic member 4 on a rotating shaft 1 and by way of transmission engagement among these components. Specifically, in the first state, the adapting member 3 and the drive member 2 are locked and engaged with each other through a magnetic force, so that when the rotating shaft 1 rotates, the drive member 2 fixed on the rotating shaft 1 drives the adapting member 3 to rotate. In the second state, the rotating shaft 1 stops rotating, and the adapting member 3 and the magnetic member 4 are locked and engaged with each other, so that the adapting member 3 is locked and prevented from rotating further. The rotating shaft connection apparatus of the disclosure has a simple structure; the rotating shaft 1 can be smoothly rotated, so that the adapting member 3 is evenly stressed; and the adapting member 3 and the magnetic member 4 attract each other and are locked and engaged with each other through a magnetic force, so that the locking force can be easily adjusted. This greatly improves user experience and comfort.

Further, the rotating shaft connection apparatus further includes an elastic member 5 provided between the drive member 2 and the adapting member 3. The elastic member 5 is configured to enable the adapting member 3 to return to the second state when the rotating shaft 1 stops rotating.

In the present embodiment, the adapting member 3 may return to its previous state under the action of a magnetic force or a mechanical force. In practical applications, a simply structured elastic member 5, such as a compression spring, is usually adopted. The compression spring is sleeved on the rotating shaft 1. The adapting member 3 is provided on a side thereof, facing the drive member 2, with an annular groove 31 in which the elastic member 5 may be compressibly received. When the repulsive force between the magnetic member 4 and the adapting member 3 disappears, the adapting member 3 may return to the second state under an elastic force of the spring. Further, by providing the annular groove 31, the spring can be compressibly received in the annular groove 31 in the first state without affecting the locking and engagement between the adapting member 3 and the drive member 2.

Figure 3:
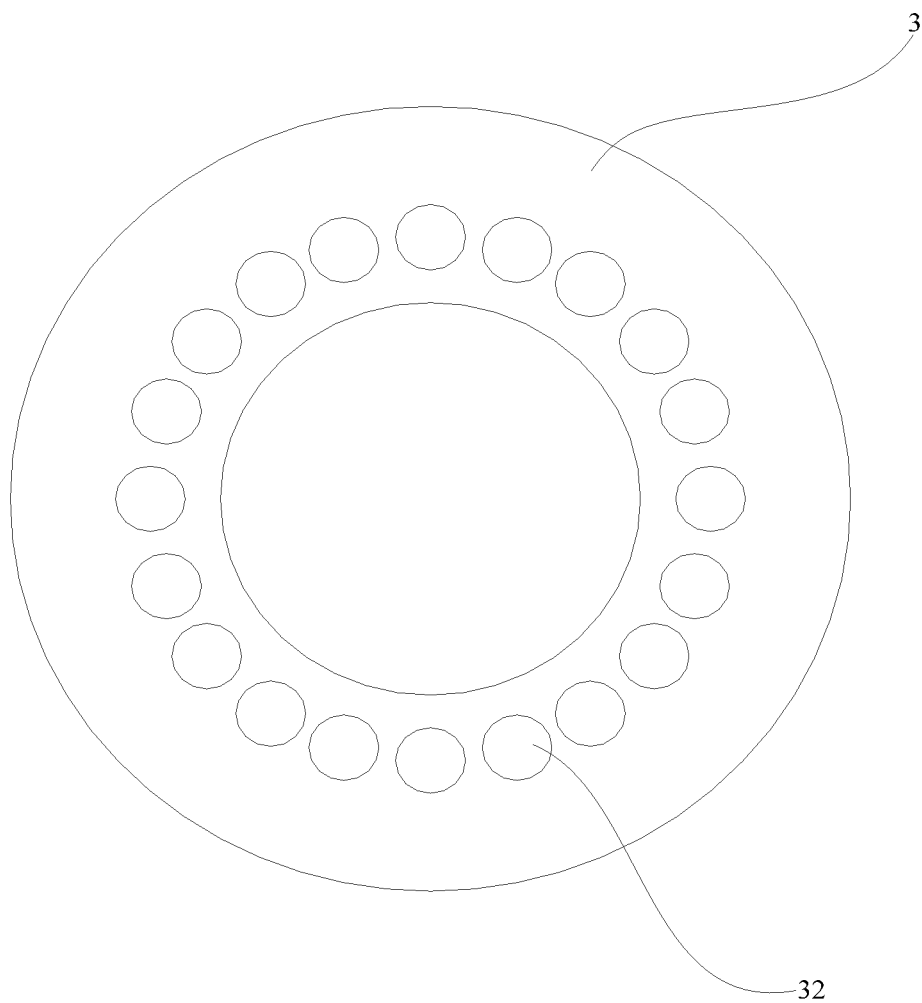
FIG. 3 is a schematic structural view of two end sides of an adapting member as shown in FIG. 1.
Figure 4:
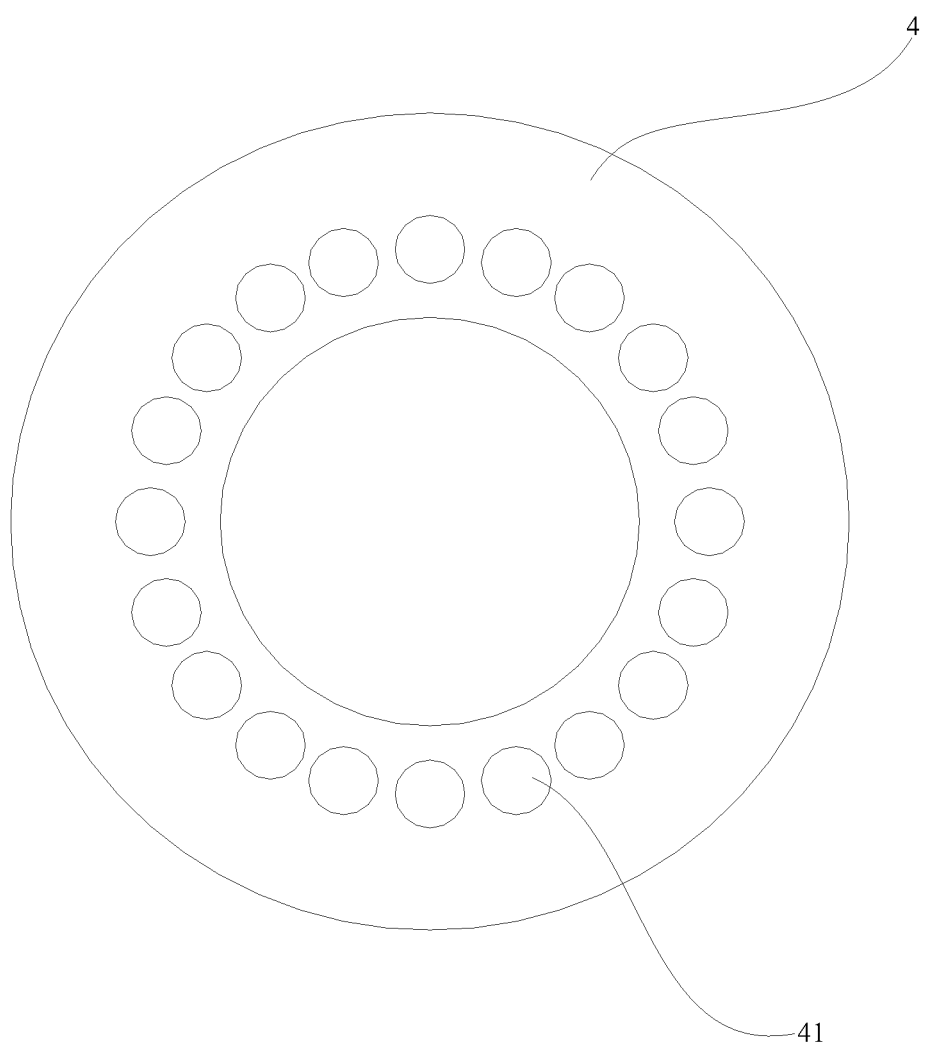
FIG. 4 is a schematic view of an end side of a magnetic member engaging with an adapting member as shown in FIG. 1.

Further, referring to FIGS. 3 and 4, two end sides of the adapting member 3 are respectively provided with a plurality of hemispherical protruding teeth 32 along a circumferential direction of the rotating shaft 1. An end side of the drive member 2 and an end side of the magnetic member 4 facing the adapting member 3 are respectively provided with hemispherical recesses 41 adapted to the protruding teeth 32.

In the present embodiment, by way of tooth surface engagement, engagement surfaces of the drive member 2 and the adapting member 3, and engagement surfaces of the adapting member 3 and the magnetic member 4 are enabled to be locked with each other more securely. The protruding teeth 32 may have various shapes, such as a hemispherical shape or a tapered shape, and accordingly the recesses 41 may have a shape adapted to the shape of the protruding teeth 32. In order to facilitate alignment and engagement of the two engagement surfaces, it is preferable to configure the protruding teeth 32 and the recesses 41 to be in a hemispherical shape having a smooth guiding surface. In the present embodiment, a plurality of protruding teeth 32 is provided on the two end sides of the adapting member 3, and a plurality of recesses is provided correspondingly on the drive member 2 and the magnetic member 4. Of course, the plurality of protruding teeth 32 may also be provided on the drive member 2 and/or the magnetic member 4.

Further, the rotating shaft connection apparatus further includes a motor 6. In the first state, the motor 6 drives the rotating shaft 1 so as to rotate the adapting member 3.

In the present embodiment, smooth rotation of the rotating shaft 1 can be ensured by using the motor 6 to drive the rotating shaft 1, and the adapting member 3 can be enabled to rotate or keep stationary by controlling the starting and stopping of the motor 6.

The disclosure also provides a multi-screen mobile terminal device. The multi-screen mobile terminal device includes a plurality of display screens and a rotating shaft connection apparatus connecting any two adjacent display screens. For the two adjacent display screens, one display screen is fixedly connected with a rotating shaft 1 and a magnetic member 4, and the other display screen is fixedly connected with an adapting member 3.

In the present embodiment, the rotating shaft connection apparatus has a structure referring to the above embodiment, which will not be detailed herein again. The multi-screen mobile terminal device may be a mobile phone, a tablet, or a liquid crystal display panel. A dual-screen mobile phone is used herein as an example. A rotating shaft 1 and a magnetic member 4 of a rotating shaft connection apparatus are fixedly connected with a first display screen. It shall be appreciated that the first display screen and the rotating shaft 1 are not fixed directly together but fixed by means of a first connecting portion, so that the first display screen does not rotate with the rotating shaft 1 as the rotating shaft 1 is rotated. A second display screen is fixedly connected with an adapting member 3, so that the second display screen can rotate with the rotation of the adapting member 3 and can maintain a certain rotation angle while the adapting member 3 is locked.

Further, the multi-screen mobile terminal device includes a rotation control unit, and the rotating shaft connection apparatus includes a motor 6. The magnetic member 4 is an electromagnet. The rotation control unit is electrically connected with the motor 6 and the magnetic member 4, and is configured to control the rotating shaft connection apparatus to rotate to a predetermined position based on a predetermined rotation angle. Preferably, the multi-screen mobile terminal device further includes a gyro sensor electrically connected with the rotation control unit, and the rotation control unit is further configured to adjust a relative rotation angle between any two adjacent display screens in real time based on a spatial coordinate value fed back by the gyro sensor.

In the present embodiment, the rotation control unit is electrically connected with the motor 6 and the magnetic member 4, and the motor can be driven by operating a button or a touch screen so as to realize control of the rotation of the rotating shaft 1. During operation, a user needs only to touch a button or a display screen based on a predetermined rotation position, thereby realizing single-hand operation, which greatly improves user experience and comfort. Besides, by using the rotation control unit to set an arbitrary rotation angle, a relative rotation angle between two adjacent display screens can be adjusted freely to realize locking at any position. The gyro sensor can locate the relative rotation angle between any two adjacent display screens in real time, and when the relative rotation angle between the two display screens deviates from a predetermined value, the rotation control unit is used to drive the rotating shaft 1 to rotate and perform a motion compensation, so that the relative rotation angle between the two adjacent screens is kept within a stable threshold value. Even if the user shakes the mobile phone, a distance and an angle of the mobile phone screen from and relative to the user are always maintained at a predetermined relatively fixed position, thereby giving the user a better experience, comfort, and fun.

The above is only descriptions of preferred embodiments of the disclosure, and is not intended to limit the protection scope of the disclosure. All equivalent structural variations made based on the inventive concept of the disclosure and by using the description and the drawings of the disclosure, or direct/indirect use of the disclosure in other related technical fields shall all be included in the protection scope of the disclosure.

INDUSTRIAL APPLICABILITY

The embodiments provided by the disclosure can be applied to the technical field of communication devices. In the embodiments of the disclosure, through providing a drive member, an adapting member, and a magnetic member on a rotating shaft, the rotating shaft connection apparatus is controlled to freely switch between a rotating state and a stationary state by means of drive cooperation of these members. Specifically, in the first state, the adapting member and the drive member are locked and engaged with each other through a magnetic force action, so that when the rotating shaft rotates, the drive member fixed on the rotating shaft drives the adapting member to rotate; in the second state, the rotating shaft stops rotating, and the adapting member and the magnetic member are locked and engaged with each other, causing the adapting member to be locked and prevented from rotating further. The rotating shaft connection apparatus provided by the embodiments of the disclosure has a simple structure; the rotating shaft can be smoothly rotated, so that the adapting member is evenly stressed; and the adapting member and the magnetic member attract each other by the magnetic force and are locked and engaged with each other, which facilitates adjustment of the locking force. User experience and comfort level is thus greatly improved.

The invention claimed is:

1. A rotating shaft connection apparatus for a multi-screen mobile terminal device, comprising: a rotating shaft, a drive member, an adapting member, and a magnetic member, wherein the drive member is fixed on the rotating shaft; the adapting member and the magnetic member are rotatably sleeved on the rotating shaft; the adapting member is located between the drive member and the magnetic member; and the adapting member is slidably engaged with the rotating shaft in an axial direction; wherein in a first state, the adapting member is engaged with the drive member in a locking manner, and the rotating shaft is rotated to rotate the adapting member; in a second state, the rotating shaft stops rotating, and the adapting member is engaged with the magnetic member in a locking manner;

the rotating shaft connection apparatus further comprising an elastic member provided between the drive member and the adapting member, the elastic member is configured to enable the adapting member to return to the second state when the rotating shaft stops rotating;

wherein the adapting member is provided with an annular groove at a side, facing the drive member, of the adapting member, and the elastic member is compressibly received in the annular groove.

2. The rotating shaft connection apparatus according to claim 1, wherein the adapting member is a permanent magnet, and the magnetic member is an electromagnet.

3. The rotating shaft connection apparatus according to claim 1, wherein the elastic member is a compression spring and is sleeved on the rotating shaft, an end of the elastic member is elastically abutted against the drive member, and another end of the elastic member is elastically abutted against the adapting member.

4. The rotating shaft connection apparatus according to claim 1, wherein two end sides of the adapting member are respectively provided with a plurality of hemispherical protruding teeth along a circumferential direction of the rotating shaft, and an end side of the drive member and an end side of the magnetic member, facing the adapting member, are respectively provided with hemispherical recesses matched with the protruding teeth.

5. The rotating shaft connection apparatus according to claim 1, further comprising a motor, wherein in the first state, the motor drives the rotating shaft to rotate the adapting member.

6. A multi-screen mobile terminal device, comprising: a plurality of display screens, and a rotating shaft connection apparatus, according to claim 1, connecting any two adjacent display screens, wherein for the two adjacent display screens, one display screen is fixedly connected with the rotating shaft and the magnetic member, and the other display screen is fixedly connected with the adapting member.

7. The multi-screen mobile terminal device according to claim 6, further comprising a rotation control unit, wherein the rotating shaft connection apparatus is the rotating shaft connection apparatus which comprises a motor, wherein in the first state, the motor drives the rotating shaft to rotate the adapting member; the magnetic member is an electromagnet; the rotation control unit is electrically connected with the motor and the magnetic member, and is configured to control the rotating shaft connection apparatus to rotate to a predetermined position according to a predetermined rotation angle.

8. The dual-screen mobile terminal device according to claim 7, further comprising a gyro sensor electrically connected with the rotation control unit, wherein the rotation control unit is further configured to adjust a relative rotation angle between any two adjacent display screens in real time according to a spatial coordinate value fed back by the gyro sensor.

9. The rotating shaft connection apparatus according to claim 2, further comprising a motor, wherein in the first state, the motor drives the rotating shaft to rotate the adapting member.

10. The rotating shaft connection apparatus according to claim 3, further comprising a motor, wherein in the first state, the motor drives the rotating shaft to rotate the adapting member.

11. The rotating shaft connection apparatus according to claim 4, further comprising a motor, wherein in the first state, the motor drives the rotating shaft to rotate the adapting member.

12. A multi-screen mobile terminal device, comprising: a plurality of display screens, and a rotating shaft connection apparatus, according to claim 2, connecting any two adjacent display screens, wherein for the two adjacent display screens, one display screen is fixedly connected with the rotating shaft and the magnetic member, and the other display screen is fixedly connected with the adapting member.

13. A multi-screen mobile terminal device, comprising: a plurality of display screens, and a rotating shaft connection apparatus, according to claim 3, connecting any two adjacent display screens, wherein for the two adjacent display screens, one display screen is fixedly connected with the rotating shaft and the magnetic member, and the other display screen is fixedly connected with the adapting member.

14. A multi-screen mobile terminal device, comprising: a plurality of display screens, and a rotating shaft connection apparatus, according to claim 4, connecting any two adjacent display screens, wherein for the two adjacent display screens, one display screen is fixedly connected with the rotating shaft and the magnetic member, and the other display screen is fixedly connected with the adapting member.

* * * * *